United States Patent
Youn et al.

(10) Patent No.: US 10,457,270 B2
(45) Date of Patent: Oct. 29, 2019

(54) METHOD FOR CONTROLLING HYBRID STARTER AND GENERATOR FOR IMPROVING FUEL EFFICIENCY AND ECO-FRIENDLY VEHICLE

(71) Applicants: HYUNDAI MOTOR COMPANY, Seoul (KR); KIA MOTORS CORPORATION, Seoul (KR)

(72) Inventors: Kil-Young Youn, Suwon-si (KR); Young-Un Kim, Suwon-si (KR); Yong-Sung Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 187 days.

(21) Appl. No.: 15/827,393

(22) Filed: Nov. 30, 2017

(65) Prior Publication Data
US 2018/0162358 A1    Jun. 14, 2018

(30) Foreign Application Priority Data
Dec. 12, 2016    (KR) .................. 10-2016-0168664

(51) Int. Cl.
*B60W 20/13*    (2016.01)
*B60W 10/26*    (2006.01)
(Continued)

(52) U.S. Cl.
CPC .............. *B60W 20/13* (2016.01); *B60L 7/18* (2013.01); *B60L 15/2009* (2013.01);
(Continued)

(58) Field of Classification Search
CPC ...... B60W 20/13; B60W 20/14; B60W 10/06; B60W 10/08; B60W 10/26; B60W 20/00;
(Continued)

(56) References Cited

U.S. PATENT DOCUMENTS

| 2005/0077877 | A1* | 4/2005 | Cawthorne | ........... B60W 10/26 320/128 |
| 2017/0257055 | A1* | 9/2017 | Kitaori | .................... B60L 50/61 |
| 2017/0335816 | A1* | 11/2017 | Hao | ........................ B60L 50/51 |

FOREIGN PATENT DOCUMENTS

| JP | H08-183356 A | 7/1996 |
| JP | H09-135502 A | 5/1997 |
(Continued)

*Primary Examiner* — Calvin Cheung
(74) *Attorney, Agent, or Firm* — Brinks Gilson & Lione

(57) ABSTRACT

A method for controlling a hybrid starter and generator (HSG) is applied to an eco-friendly vehicle. The method includes HSG torque-output limiting control, and in particular, the HSG torque-output limiting control is divided into an HSG regeneration mode and an HSG driving mode in which output limitation of the HSG 3 is performed after torque limitation of the HSG 3. Furthermore, the HSG regeneration mode includes: a former regenerative torque output control in which an engine RPM is converted by a controller 10 into regenerative torque output of the HSG 3 for about 1 second when an engine starts idling to charge a battery, and a latter regenerative torque output control in which the engine RPM is converted into the regenerative torque output of the HSG 3 after 1 second to about five seconds to continue to charge the battery 7, and an HSG driving mode.

15 Claims, 6 Drawing Sheets

(51) Int. Cl.
  *B60W 10/08* (2006.01)
  *B60W 50/038* (2012.01)
  *B60W 10/06* (2006.01)
  *B60W 20/14* (2016.01)
  *B60L 7/18* (2006.01)
  *B60L 15/20* (2006.01)
  *B60L 50/15* (2019.01)
  *B60L 50/16* (2019.01)
  *B60L 53/24* (2019.01)
  *B60L 58/12* (2019.01)
  *B60W 20/00* (2016.01)
  *B60W 20/10* (2016.01)

(52) U.S. Cl.
  CPC ........... *B60L 15/2054* (2013.01); *B60L 50/15* (2019.02); *B60L 50/16* (2019.02); *B60L 53/24* (2019.02); *B60L 58/12* (2019.02); *B60W 10/06* (2013.01); *B60W 10/08* (2013.01); *B60W 10/26* (2013.01); *B60W 20/00* (2013.01); *B60W 20/10* (2013.01); *B60W 20/14* (2016.01); *B60W 50/038* (2013.01); *B60L 2240/421* (2013.01); *B60L 2240/423* (2013.01); *B60L 2240/441* (2013.01); *B60L 2240/443* (2013.01); *B60W 2510/0638* (2013.01); *B60W 2510/081* (2013.01); *B60W 2510/083* (2013.01); *Y02T 10/6286* (2013.01); *Y02T 10/7005* (2013.01)

(58) Field of Classification Search
  CPC ............... B60W 20/10; B60W 50/038; B60W 2510/0638; B60W 2510/081; B60W 2510/083; B60L 50/15; B60L 50/16; B60L 53/24; B60L 58/12; B60L 7/18; B60L 15/2009; B60L 15/2054; B60L 2240/421; B60L 2240/423; B60L 2240/441; B60L 2240/443; Y02T 10/6286; Y02T 10/7005
  See application file for complete search history.

(56) References Cited

FOREIGN PATENT DOCUMENTS

| | | |
|---|---|---|
| JP | 2005-198414 A | 7/2005 |
| JP | 2014-101048 A | 6/2014 |

* cited by examiner

METHOD FOR CONTROLLING HYBRID STARTER AND GENERATOR FOR IMPROVING FUEL EFFICIENCY AND ECO-FRIENDLY VEHICLE

CROSS-REFERENCE TO RELATED APPLICATION

This application claims priority to and the benefit of Korean Patent Application No. 10-2016-0168664, filed on Dec. 12, 2016, which is incorporated herein by reference in its entirety.

FIELD

The present disclosure relate to a hybrid starter and generator, and more particularly, to a method for controlling a hybrid starter and generator and an eco-friendly vehicle capable of more improving fuel efficiency.

BACKGROUND

The statements in this section merely provide background information related to the present disclosure and may not constitute prior art.

Generally, regulations for an eco-friendly vehicle such as a hybrid electronic vehicle (hereinafter, referred to as HEV) including a plug-in hybrid electronic vehicle (PHEV) include motor regulations for a driving motor generating driving power together with an engine.

The motor regulations include net power regulations regulating maximum output of a motor.

Accordingly, maximum output of the hybrid starter and generator (hereinafter, referred to as HSG) applied to the HEV and rotated by the engine separately from the driving motor is also limited due to an influence of the motor regulations. Here, the HSG charges a high voltage battery at the time of engine start and during driving, and controls power generation amount according to a load amount of the engine or the motor.

Hereinafter, MTPA is an abbreviation of "maximum torque per ampere" that means maximum torque per unit current, represented by an MPTA curve, and applied to field weakening or flux weakening. The field weakening is a method of increasing torque by armature current that is increased by decreasing counter electromotive force by weakening field magnetic flux in an counter electromotive force increase phenomenon due to increase in speed and a torque decrease phenomenon due to decrease in armature current after an allowable terminal voltage of the motor is reached.

Specifically, the HSG control implemented in the HEV is a method of implementing maximum output limitation of the HSG as torque and power limitation by limiting an MTPA region to constant torque, and limiting regions after the MTPA region to constant output. At this point, the maximum output limitation is performed within up to 2% as compared to HSG specification due to the influence of the net power regulations.

The method of simultaneously limiting the torque and the output of the HSG as described above is called a torque-output limiting method, and is performed in a manner that a motor control unit controlling the driving motor is connected to a hybrid control unit. A practical logic of the torque-output limiting method is divided into an HSG driving mode and an HSG regeneration mode.

For example, the HSG driving mode of the torque-output limiting method is a method in which torque limitation is performed up to about 2,100 rpm after the engine starts, and thereafter, the method is shifted to the output limitation. Meanwhile, the HSG regeneration mode of the torque-output limiting method is a method in which a zero torque control state is maintained after the engine starts, and engine energy is applied as regenerative torque of the HSG in an RPM decrease state due to engine off following engine idle, and the HSG regeneration mode is performed for about five seconds.

In the torque-output limiting method, engine characteristics may not be maximally reflected when implementing the HSG regeneration mode.

For example, the engine RPM is high at the time of engine idle and changed to be low right before the engine is turned off, and becomes zero when the engine is turned off. However, in the torque-output limiting method, regenerative torque output of the HSG after the low RPM is controlled in a zero torque control state after the engine starts. As a result, the HSG gradually increases initial regenerative torque output in a limited state, then the increased torque output is maintained constantly and decreased, and the battery is charged using the engine energy except for the limited initial regenerative torque output.

We have discovered that, in view of the engine characteristic of repeating operation and stop, fuel efficiency may be additionally improved by decreasing friction loss of the engine energy, but in the current torque-output limiting method, since the initial regenerative torque output is limited, the fuel efficiency may not be additionally improved.

SUMMARY

The present disclosure provides a method for controlling a hybrid starter and generator capable of additionally improving fuel efficiency by using engine energy that was wasted as friction loss after an engine starts idling. As HSG regenerative torque output that is performed from engine driving to engine off following engine idle is divided into regenerative torque output to which engine RPM when the engine starts idling is applied, and latter generative torque output to which engine RPM after the engine idle to engine off is applied, and particularly, allowing engine energy absorption for the HSG regenerative torque output to be performed at less than maximum torque that is smaller than maximum current, thereby inhibiting or preventing durability or performance from deteriorating, and an eco-friendly vehicle.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the forms of the present disclosure and combinations thereof.

In accordance with one form of the present disclosure, a method for controlling a hybrid starter and generator (HSG) is performed by (A) a step in which in a state of zero torque control of the HSG by a controller after an engine is turned on, an engine RPM is detected as engine idle to divide an HSG torque-output limiting control into an HSG driving mode and an HSG regeneration mode, (B) a step in which when entering the HSG regeneration mode, a timer initialized at the time of detection of the engine idle performs counting, (C) a step in which the HSG is rotated with maximum former HSG mapping torque that is less than maximum torque of the HSG as regenerative torque output, (D) a step in which the regenerative torque output control by the rotation of the HSG is maintained for the former part set time to charge the battery, (E) a step in which the HSG is rotated with maximum latter HSG mapping torque that is less than the maximum torque of the HSG as latter regenerative torque output after the former part set time elapses, (F) a step in which the latter regenerative torque output control by the rotation of the HSG is maintained for the latter part set time to charge the battery, and (G) a step in which output limitation is performed after an engine RPM at which torque limitation is performed when entering the HSG driving mode.

The regenerative torque output control may be divided into (c-1) a step in which the maximum former HSG mapping torque is compared with required torque of a hybrid control unit (HCU) controlling a generation load of the HSG, (c-2) a step in which when the maximum former HSG mapping torque is greater than the required torque of the HCU, required torque of a motor control unit (MCU) controlling a driving motor is set as the required torque of the HCU to determine the regenerative torque output, and (c-3) a step in which when the maximum former HSG mapping torque is less than the required torque of the HCU, the required torque of the MCU controlling the driving motor is set as the maximum former HSG mapping torque to determine the regenerative torque output. The maximum latter HSG mapping torque may be calculated by an HSG torque-speed diagram at current speed of the HSG and mapped to a latter regenerative torque map.

The latter regenerative torque output control may be divided into (d-1) a step in which the maximum latter HSG mapping torque is compared with required torque of a hybrid control unit (HCU) controlling a generation load of the HSG, (d-2) a step in which when the maximum latter HSG mapping torque is greater than the required torque of the HCU, required torque of a motor control unit (MCU) controlling a driving motor is set as the required torque of the HCU to determine the latter regenerative torque output, and (d-3) a step in which when the maximum latter HSG mapping torque is less than the required torque of the HCU, the required torque of the MCU controlling the driving motor is set as the maximum latter HSG mapping torque to determine the latter regenerative torque output.

In another form of the present disclosure, an eco-friendly vehicle includes: a controller configured to perform hybrid starter and generator (HSG) torque-output limiting control divided into an HSG regeneration mode including a former regenerative torque output control, a latter regenerative torque output control following the former regenerative torque output control, and an HSG driving mode. In particular, in the former regenerative torque output control, an engine RPM is converted into regenerative torque output of an HSG when an engine starts idling during a former part set time to charge a battery. In the latter regenerative torque output control, the engine RPM is converted into the regenerative torque output of the HSG during a latter part set time following the former part set time to continue to charge the battery. In the HSG driving mode, output limitation is performed after torque limitation, and the HSG is configured to be connected to the engine and controlled by the controller so that torque-output limitation is performed.

The controller may include a former regenerative torque map in which maximum torque that is less than maximum torque of specification of the HSG is mapped as maximum former HSG mapping torque, and a latter regenerative torque map in which maximum torque that is less than maximum torque of specification of the HSG is mapped as maximum latter HSG mapping torque. The former regenerative torque map may charge the battery with the maximum former HSG mapping torque for about one second at the time of engine off after engine idle, and the latter regenerative torque map may charge the battery with the maximum latter HSG mapping torque after one second to about five seconds.

The controller may be a motor control unit (MCU) controlling a driving motor that is connected and separated to and from the engine via a clutch, and the MCU may be connected to a hybrid control unit controlling a generation load of the HSG.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
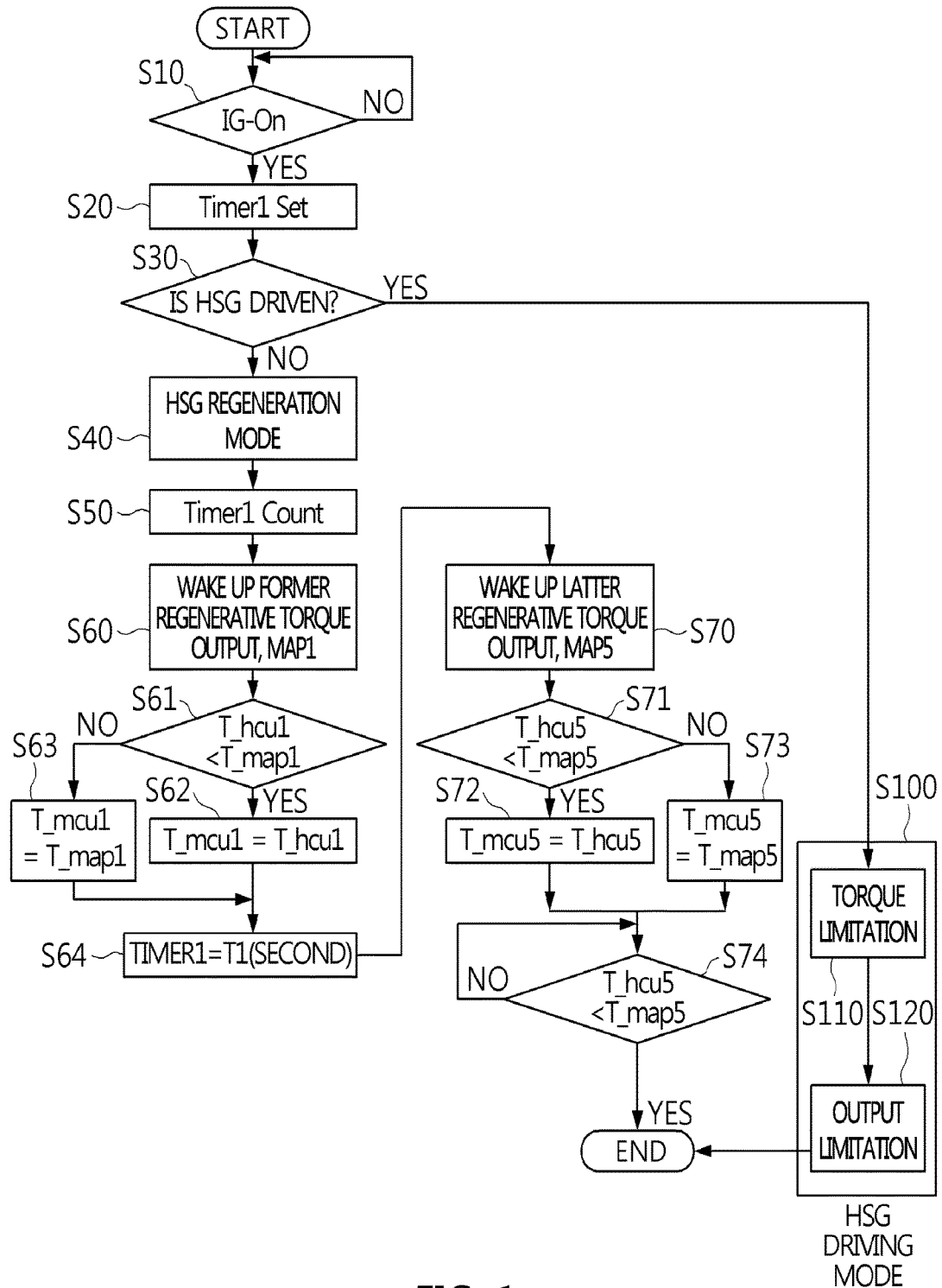
FIG. 1 is a flow chart illustrating a method for controlling a hybrid starter and generator ("HSG")

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, in an HSG control method, an HSG torque-output limiting method divided into an HSG driving mode and an HSG regeneration mode is applied. The HSG regeneration mode is divided into two stages (i.e., a former part and a latter part), and performed for about five seconds in such a manner that regenerative torque output for the former part is performed and then regenerative torque output for the latter part is performed. Herein, the regenerative torque output for the former part is referred to as a former regenerative torque output, and the regenerative torque output is referred to as a latter regenerative torque output. As a result, according to the HSG torque-output limiting method, it is possible to reduce friction loss of engine energy by output potential increased to about 4000 revolution per minute (rpm) while satisfying a specification range with HSG torque less than maximum torque that is smaller than maximum current, thereby improving additionally improve fuel efficiency as much as the decreased friction loss.

Figure 2:
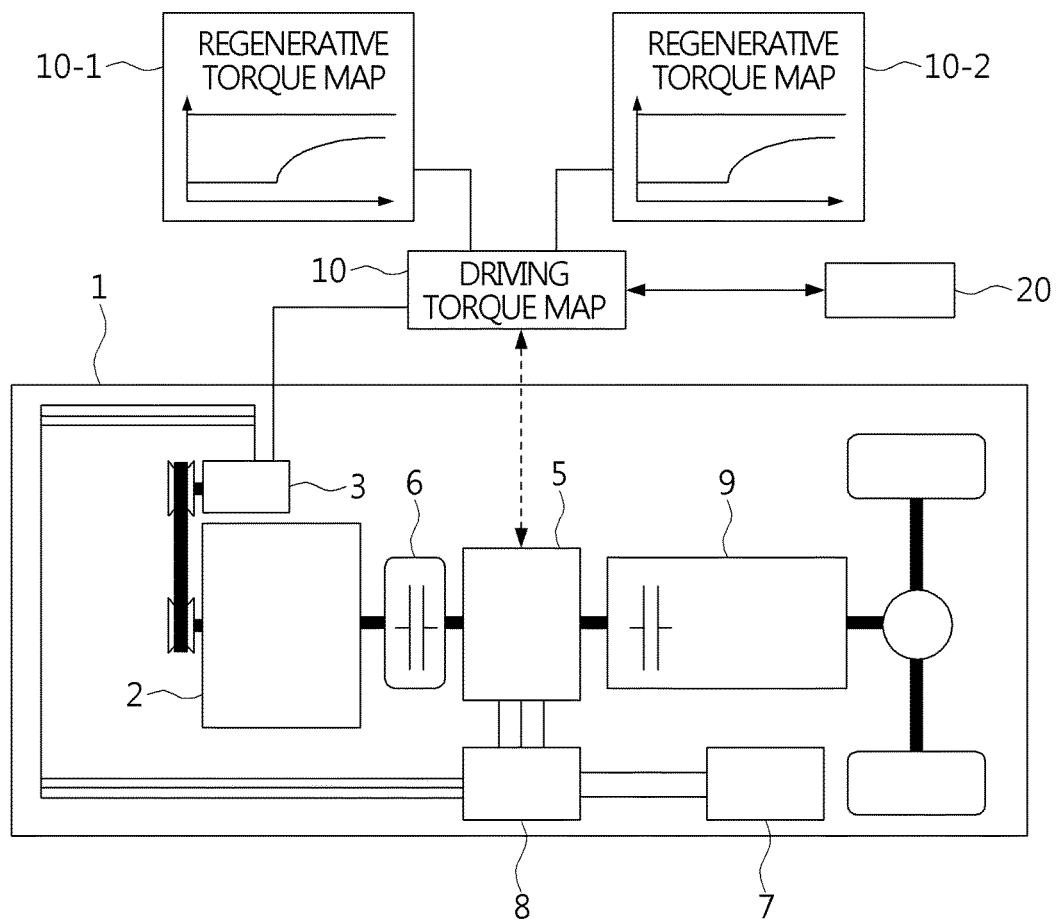
FIG. 2 illustrates an example of an eco-friendly vehicle to which a method of controlling the hybrid starter and generator ("HSG") applies.

Referring to FIG. 2, an eco-friendly vehicle 1 includes an engine 2, a hybrid starter and generator (HSG) 3, a driving motor 5, a clutch 6, a battery 7, an integrated inverter 8, a power transfer device 9, a motor control unit (MCU) 10, a hybrid control unit (HCU) 20, and an HSG regenerative torque map 10-1, 10-2.

The battery 7 is a high voltage battery, and is connected to the integrated inverter 8 to supply current to the driving motor 5 and maintained to state of charge (SOC) by the HSG 3. The power transfer device 9 transfers output of the driving motor 5 to wheels.

Specifically, the MCU 10 and the HCU 20 are controllers controlling the eco-friendly vehicle 1, the MCU 10 controls the HSG 3 and the driving motor 5, the HCU 20 that is a higher controller connected to the MCU 10 to control and manage the HSG 3 and the battery 7 may be a vehicle control unit (VCU). Specifically, the HSG regenerative torque map is divided into a driving torque map of the MCU 10, a former regenerative torque map 10-1, and a latter regenerative torque map 10-2. The driving torque map is applied to the HSG driving mode, and the former regenerative torque map 10-1 is applied for less than one second from the start of the regenerative torque in a regenerative torque time of about five seconds, and the latter regenerative torque map 10-2 is applied from one second after the start of the regenerative torque to five seconds when the regenerative torque ends in the regenerative torque time of about five seconds.

Hereinafter, the HSG control method for improving fuel efficiency in one form of the present disclosure will be specified as an HSG torque-output limiting control and described in detail with reference to FIGS. 1 to 6. In this case, a control subject is the MCU 10 connected to the HCU 20 and having the HSG regenerative torque map and will be described as a controller. A control target is the engine 2 and the HSG 3 connected to the battery 7.

The controller enters the HSG torque-output limiting control by performing a timer initialization at S20 when an IG-On state in which the engine 2 is started by the HSG 30 is detected at S10. Here, the timer initialization is a time count for applying the former regenerative torque map 10-1, in which a timer is set to 0 (zero), and performs counting for less than one second, and the timer performing the above described operation is named as Timer 1, and may be implemented by applying a clock device or as software. As a result, the controller enters the HSG torque-output limiting control.

Next, the controller entering the HSG torque-output limiting control classifies the HSG driving mode in S100 and the HSG regeneration mode in S40 according to a HSG driving state determination step S30. To this end, the controller regards engine idle as entering into the HSG regeneration mode in a zero torque control state of the HSG 3 after the engine 2 starts according to the IG-On. Alternatively, the controller may detect IG-off or apply required torque of the MCU 10 or the HCU 20. For example, when the IG-off means engine off, the required torque of the MCU 10 is T_mcu, and the required torque of the HCU 20 is T_hcu, it is possible to make it a condition that each of T_mcu and T_hcu is smaller than a value required in the HSG driving mode.

The HSG regeneration mode in S40 is performed by being divided by the controller into a former regenerative torque output control in S60 to S64, and a latter regenerative torque output control in S70 to S74. In this case, the former regenerative torque output control is a regenerative torque output control for the regenerative torque output for the former part, and the latter regenerative torque output control is a latter regenerative torque output control for the regenerative torque output for the latter part. Accordingly, the regenerative torque output is performed in such a manner that the former regenerative torque output control is performed, and then the latter regenerative torque output control is performed.

The regenerative torque output control is divided into a former regenerative torque output waking-up step in S60, a required torque determination step in S61, an MCU output torque step in S62 and S63, and a timer count start step in S64.

Figure 3:
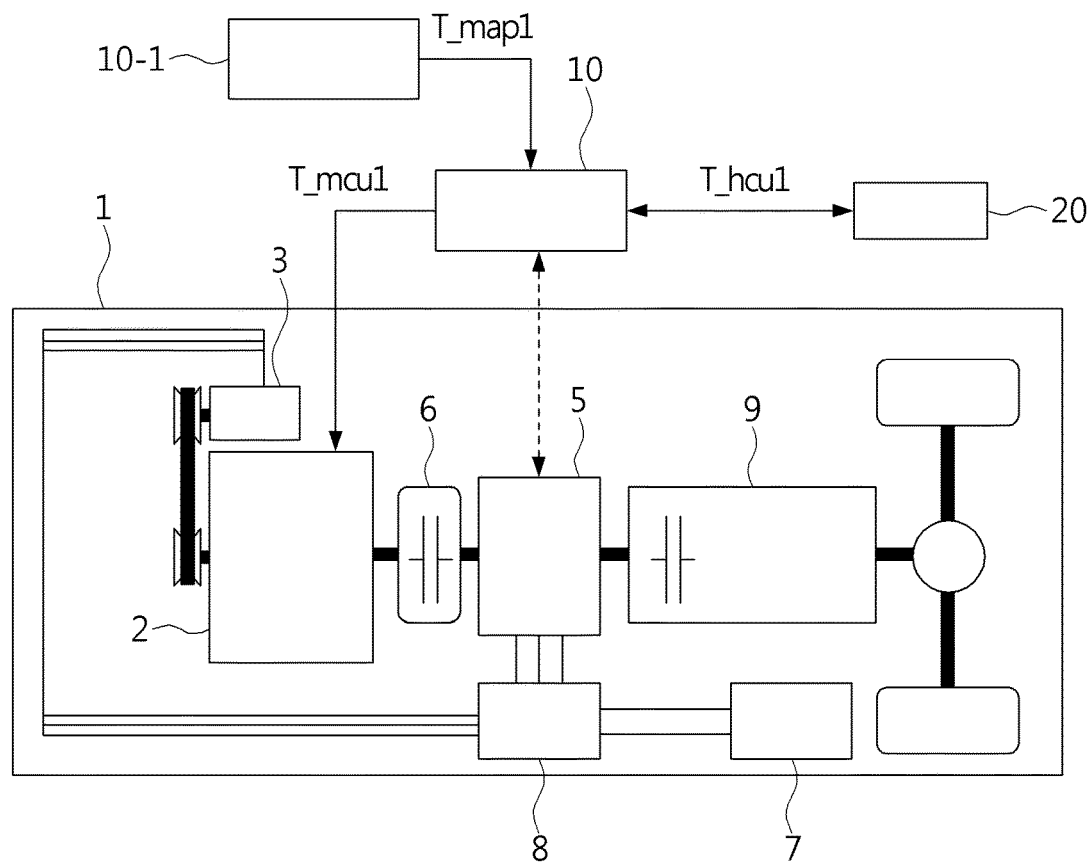
FIG. 3 illustrates a state in which the eco-friendly vehicle is controlled by the regenerative torque output for a former part of the HSG regeneration mode divided into two stages of a former part and a latter part of the control of the hybrid starter and generator.

Referring to FIG. 3, the MCU 10 functioning as a controller wakes up the former regenerative torque map 10-1 as map1 (that is, one-second map), matches HSG mapping torque of the HSG 3 at current speed (that is, engine RPM) of the engine 2 among HSG mapping torques set in the map1, and sets the matched value as T_map1, thereby performing the former regenerative output torque waking-up step in S60. In this case, the T_map1 is defined as maximum former HSG mapping torque, obtained in a torque (Nm)-speed (rpm) diagram of the HSG 3 as maximum one-second map torque of the HSG 30 at current speed, and defined as a value smaller than the maximum HSG torque provided in specification of the HSG 3.

Next, the MCU 10 receives the required torque of the HCU according to change in the engine RPM from the HCU 20, sets the required torque of the HCU as T_hcu1 to define the T_hcu1 as the required torque of the HCU at current speed of the engine 2 matched to the T_map1, and performs comparison with the T_map1, thereby performing S61. In this case, the comparison between the T_hcu1 and the T_map1 uses the following Relation Formula:

Maximum map1 torque: T_hcu1<T_map1, where "<" is an inequality sign representing sizes of two values, and "T_hcu1<T_map1" means that the maximum one-second map torque at current speed is larger than the required torque of the HCU at current speed.

As a result, when T_map1 is equal to or larger than T_hcu1, the MCU 10 sets the T_map1 as T_hcu1 and sets the T_hcu1 as T_mcu1 that is output torque of the MCU 10 to perform output in S62, and performs a timer counting step in S64 so that the control of the HSG 3 by the T_mcu1 is maintained for a set time. Meanwhile, when T_hcu1 is equal to or larger than T_map1, the MCU 10 sets the T_map1 as T_mcu1 that is output torque of the MCU 10 to perform output in S63, and performs the timer counting step in S64 so that the control of the HSG 3 by the T_mcu1 is maintained for a set time. In this case, in the timer counting in S64, setting is performed so that Timer 1=t1 (second), and the t1 (second) is a set time for the former regenerative output torque waking-up step, and is set as about one second. Accordingly, the timer counting is performed for less than one second. Further, the t1 (second) is defined as a former part set time.

Particularly, in the regenerative output torque control, engine energy absorption for the regenerative torque output of the HSG is performed at less than maximum torque that is smaller than maximum current by using T_hcu1 or T_mcu1 smaller than T_map1 that is maximum torque of the HSG 3, thereby improving durability and performance.

Next, the controller enters the latter regenerative torque output control in S70 after the timer counting is completed. The latter regenerative torque output control is divided into a latter regenerative torque output waking-up step in S70, a required torque determination step in S71, an MCU output torque step in S72 and S73, and a timer count start step in S74.

Figure 4:
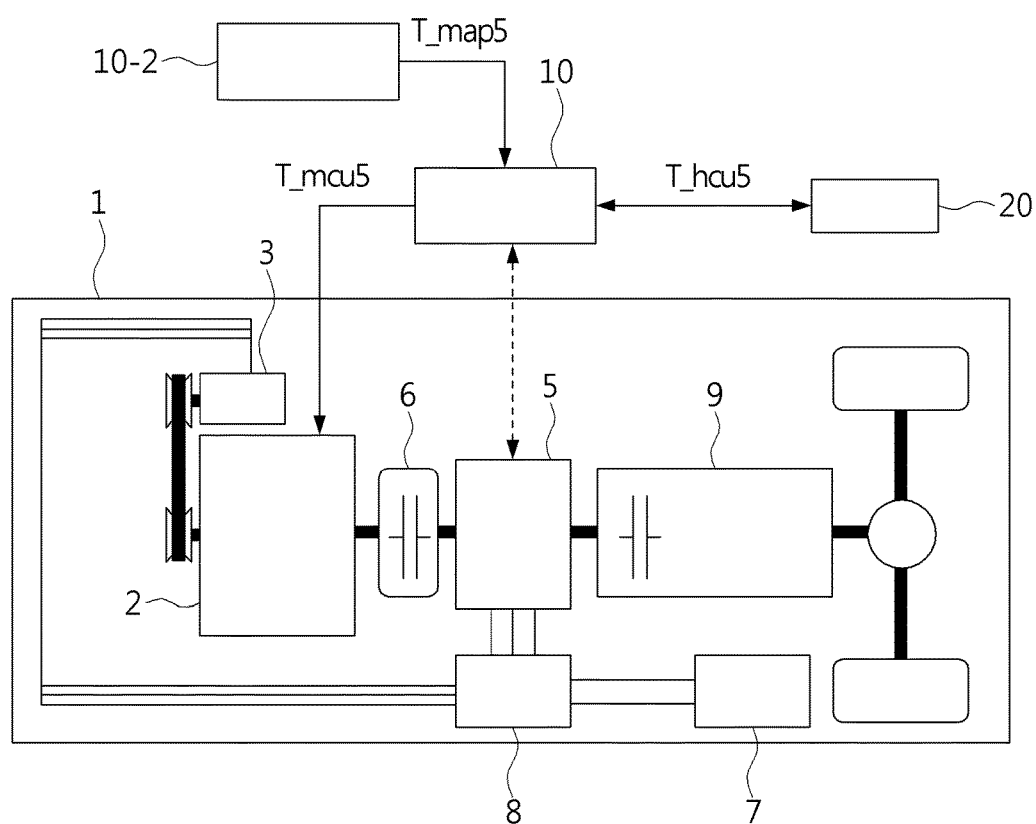
FIG. 4 illustrates a state in which the eco-friendly vehicle is controlled by the regenerative torque output for the latter part of the HSG regeneration mode divided into the former part and the latter part of the control of the hybrid starter and generator.

Referring to FIG. 4, the MCU 10 functioning as a controller wakes up the latter regenerative torque map 10-2 as map5 (that is, five-second map), matches HSG mapping torque of the HSG 3 at current speed (that is, engine RPM) of the engine 2 among HSG mapping torques set in the map5, and sets the matched value as T_map5, thereby performing the latter regenerative output torque waking-up step in S70. In this case, the T_map5 is defined as maximum latter HSG mapping torque, obtained in a torque (Nm)-speed (rpm) diagram of the HSG 3 as maximum five-second map torque of the HSG 30 at current speed, and defined as a value smaller than the maximum HSG torque provided in specification of the HSG 3.

The T_map5 is defined as maximum latter part set torque, and obtained in a torque (Nm)-speed (rpm) diagram of the HSG 3 as maximum five-second map torque.

Next, the MCU 10 receives the required torque of the HCU according to change in the engine RPM from the HCU 20, sets the required torque of the HCU as T_hcu5 to define the T_hcu5 as the required torque of the HCU at current speed of the engine 2 matched to the T_map5, and performs comparison with the T_map5, thereby performing S71. In this case, the comparison between the T_hcu5 and the T_map5 uses the following Relation Formula.

Maximum map5 torque: T_hcu5<T_map5, where "<" is an inequality sign representing sizes of two values, and "T_hcu5<T_map5" means that the maximum five-second map torque at current speed is larger than the required torque of the HCU at current speed.

As a result, when T_map5 is equal to or larger than T_hcu5, the MCU 10 sets the T_map5 as T_hcu5 and sets the T_hcu5 as T_mcu5 that is output torque of the MCU 10 to perform output in S72, and performs a timer counting step in S74 so that the control of the HSG 3 by the T_mcu5 is maintained for a set time. Meanwhile, when T_hcu5 is equal to or larger than T_map5, the MCU 10 sets the T_map5 as T_mcu5 that is output torque of the MCU 10 to perform output in S73, and performs the timer counting step in S74 so that the control of the HSG 3 by the T_mcu1 is maintained for a set time. In this case, in the timer counting in S74, setting is performed so that Timer 1=t5 (second), and the t1 (second) is a set time for the latter regenerative output torque waking-up step, and is set as about 5 seconds. Accordingly, the timer counting is performed for about 4 seconds from 1 second to 5 seconds. Further, the t5 (second) is defined as a latter part set time.

Particularly, in the latter regenerative output torque control, engine energy absorption for the regenerative torque output of the HSG is performed at less than maximum torque that is smaller than maximum current by using T_hcu5 or T_mcu5 smaller than T_map5 that is maximum torque of the HSG 3, thereby inhibiting or preventing durability or performance from deteriorating.

Figure 5:
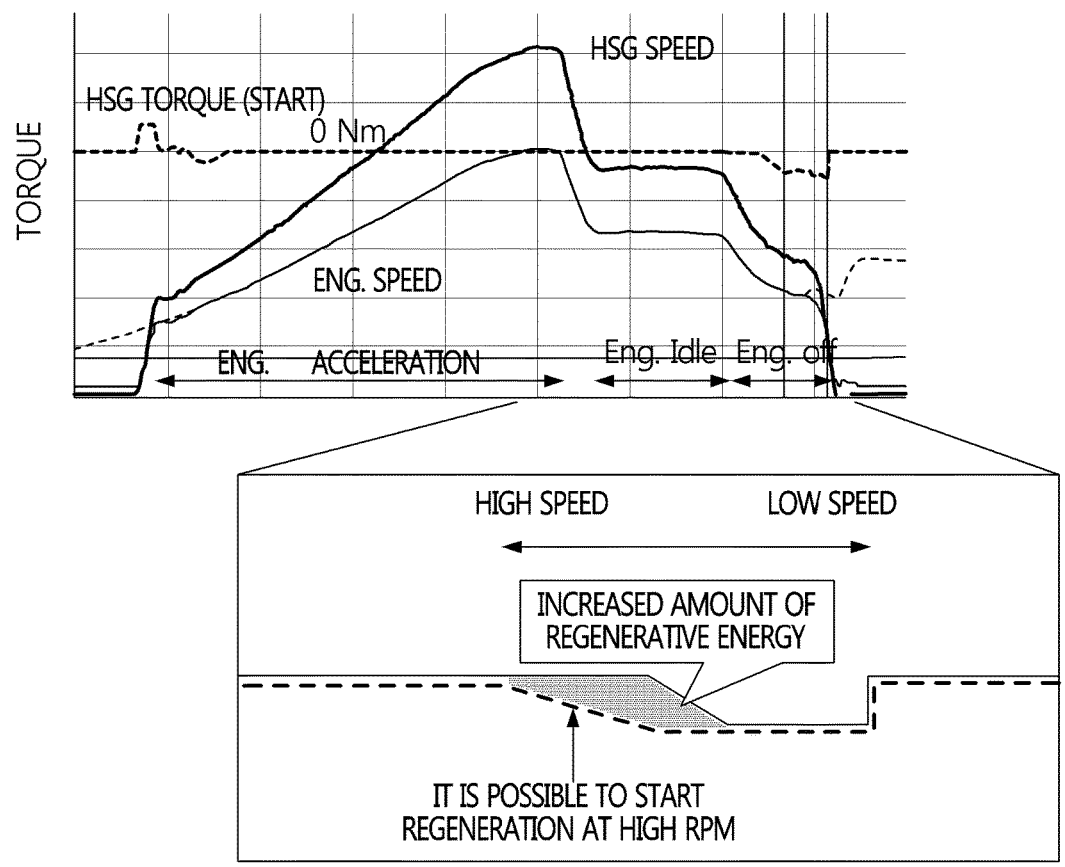
FIG. 5 illustrates an example of an HSG regeneration mode implementation effect resulting from the regenerative torque output divided into the regenerative torque output for the former part and the regenerative torque output for the latter part.

Referring to the HSG torque-speed diagram of FIG. 5, an example of the additional fuel efficiency improvement effect obtained by the former regenerative torque output control for the former part that is performed for about 1 second, and the latter regenerative torque output control for the latter part that is performed for about 4 seconds from 1 second, is shown.

As illustrated, the HSG torque-speed diagram shows a process of performing zero torque controlling of the HSG 3 after the engine 2 starts, and turning off the engine 2 (eng off) after the engine 2 is in the engine idle state (Eng idle). In the regenerative torque output control performed for about 1 second in the engine state as described above, the regenerative torque is applied from high HSG speed (that is, high HSG RPM) at the time of engine idle (Eng idle), and in the subsequent latter regenerative torque output control, the regenerative torque is applied from low HSG speed (that is, low HSG RPM as compared to the high HSG RPM) about one second after the engine idle (Eng idle) until the engine is turned off (Eng off), thereby using the engine energy from when the engine idles (Eng idle) until the engine is turned off (Eng off). As a result, it is possible to appreciate that when performing the regenerative torque output of the HSG 3, the engine energy that was wasted as friction loss after the engine starts idling is used, thereby additionally improving fuel efficiency. In this case, the high speed when the engine starts idling was measured as about 4000 engine RPM through an experiment.

Figure 6:
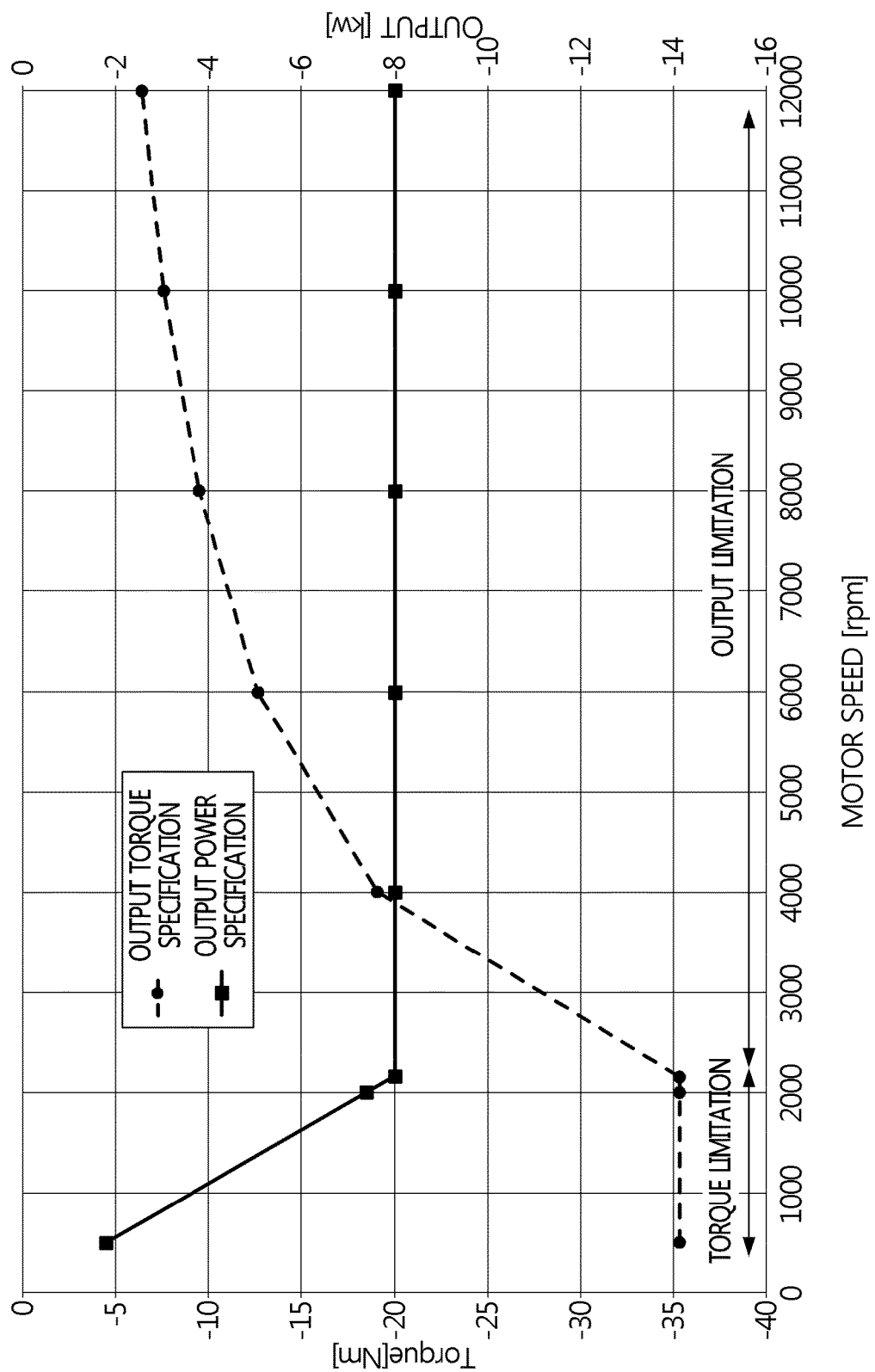
FIG. 6 illustrates an example of an HSG driving mode diagram of the control of the hybrid starter and generator of the eco-friendly vehicle.

Further, the HSG driving mode in S100 by the controller is divided into torque limitation in S110, and output limitation in S120. The HSG torque-speed diagram of FIG. 6 illustrates that in the torque limitation, the torque of the HSG 3 is limited until the engine RPM reaches about 2100 rpm after the engine starts, and in the output limitation, the output of the HSG 3 is limited after the engine RPM reaches about 2100 rpm. Therefore, the HSG driving mode is implemented in the same manner as a general existing method.

Meanwhile, the controller initializes the method for controlling a hybrid starter and generator for improving fuel efficiency in FIG. 1 when the engine is turned off, and is again activated in the initialized state when the engine is turned on according to the IG-On.

As described above, in the method for controlling a hybrid starter and generator of the eco-friendly vehicle in the exemplary forms, the HSG torque-output limiting control is performed. In particular, the HSG torque-output limiting control includes the HSG regeneration mode which is divided into the former regenerative torque output control and the latter the former regenerative torque output control. Through the former regenerative torque output control, the engine RPM is converted by the controller 10 into the regenerative torque output of the HSG 3 for about 1 second when the engine starts idling to charge the battery. Under the latter regenerative torque output control, the engine RPM is converted into the regenerative torque output of the HSG 3 for about 4 seconds after 1 second to continue to charge the battery 7. The HSG torque-output limiting control further includes the HSG driving mode in which the output limitation of the HSG 3 is performed after the torque limitation of the HSG 3. As a result, by performing the regenerative torque output of the HSG 3, the engine energy that was wasted as friction loss after the engine starts idling is used to charge the battery 7, thereby additionally improving fuel efficiency.

The eco-friendly vehicle of the present disclosure implements the HSG torque-output limiting method by the HSG driving mode in which the output limitation is performed after the torque limitation, and the HSG regeneration mode in which the regenerative torque output is divided into the former regenerative torque output for the former part and the latter regenerative torque output for the latter part, thereby implementing the following advantages and effects.

First, the former regenerative torque output for the former part is performed in an initial stage of the idle with relatively high RPM, such that the engine energy wasted as friction loss is used for charging the battery, and accordingly fuel efficiency may be additionally improved. Second, the range of the regenerative torque output may be expanded from about 2000 RPM to about 4000 RPM by using high RPM in the initial stage of the idle that corresponds to the limited initial regenerative torque output. Third, since the HSG torque generated at about 4000 RPM is less than the maximum torque that is smaller than the maximum current, thus deterioration of the electrical performance and durability due to an excess of the HSG specification may be inhibited or prevented. Fourth, the former regenerative torque output for the former part is shortly applied within about one second in the initial stage of the idle with relatively high RPM when the regenerative torque output is performed from engine driving to engine off following engine idle, thus continuous use may be possible. Fifth, in the regenerative torque output of about five seconds, the regenerative torque output for the latter part for about four seconds is continued after the regenerative torque output for the former part for about one second, thereby making it possible to more efficiently improve fuel efficiency and secure HSG durability. Sixth, as the HSG regenerative torque output is performed based on an HSG control map divided into the former part and the latter part, it is possible to improve performance while additionally improving fuel efficiency without increasing costs due to addition of hardware (H/W) in the existing eco-friendly vehicle.

What is claimed is:

1. A method for controlling a hybrid starter and generator (HSG), the method comprising:
   dividing, by a controller, a HSG torque-output limiting control into an HSG driving mode and an HSG regeneration mode; and
   dividing, by the controller, the HSG regeneration mode into a former regenerative torque output control and a later regenerative torque output control,
   wherein, in the former regenerative torque output control, an engine RPM is converted into a regenerative torque output of the HSG when an engine starts idling during a former part set time to charge a battery, and in the latter regenerative torque output control, the engine RPM is converted into the regenerative torque output of the HSG during a latter part set time following the former part set time to continue to charge the battery.

2. The method of claim 1, wherein a period for the former part set time and the latter part set time is equal to or less than five seconds.

3. The method of claim 1, wherein in the HSG regeneration mode, in a zero torque control state of the HSG after the engine is turned on, the engine RPM is detected as an engine idle, a timer initialized at a time of detection of the engine idle performs counting, and
   wherein the HSG is rotated with a maximum former HSG mapping torque that is less than a maximum torque of the HSG as a regenerative torque output, the former regenerative torque output control by the rotation of the HSG is maintained for the former part set time to charge the battery, the HSG is rotated with a maximum latter HSG mapping torque that is less than the maximum torque of the HSG as a latter regenerative torque output, and the latter regenerative torque output control by the rotation of the HSG is maintained for the latter part set time to charge the battery.

4. The method of claim 3, wherein the maximum former HSG mapping torque is calculated by an HSG torque-speed diagram at a current speed of the HSG and mapped to a former regenerative torque map.

5. The method of claim 3, wherein the former part set time is equal to or less than one second.

6. The method of claim 3, wherein in the former regenerative torque output control, the maximum former HSG mapping torque is compared with a required torque of a hybrid control unit (HCU) controlling a generation load of the HSG, and when the maximum former HSG mapping torque is greater than the required torque of the HCU, a required torque of a motor control unit (MCU) controlling a driving motor is set as the required torque of the HCU to determine the former regenerative torque output, and when the maximum former HSG mapping torque is less than the required torque of the HCU, the required torque of the MCU controlling the driving motor is set as the maximum former HSG mapping torque to determine the former regenerative torque output.

7. The method of claim 3, wherein the maximum latter HSG mapping torque is calculated by an HSG torque-speed diagram at a current speed of the HSG and mapped to a latter regenerative torque map.

8. The method of claim 3, wherein the latter part set time starts after one second assigned to the former part set time and ends when approximately five seconds pass.

9. The method of claim 3, wherein in the latter regenerative torque output control, the maximum latter HSG mapping torque is compared with a required torque of a hybrid control unit (HCU) controlling a generation load of the HSG, and when the maximum latter HSG mapping torque is greater than the required torque of the HCU, a required torque of a motor control unit (MCU) controlling a driving motor is set as the required torque of the HCU to determine the latter regenerative torque output, and when the maximum latter HSG mapping torque is less than the required torque of the HCU, the required torque of the MCU controlling the driving motor is set as the maximum latter HSG mapping torque to determine the latter regenerative torque output.

10. The method of claim 1, wherein in the HSG driving mode, output limitation for the HSG is performed after torque limitation for the HSG.

11. An eco-friendly vehicle, comprising:
   a controller configured to perform a hybrid starter and generator (HSG) torque-output limiting control divided into an HSG regeneration mode including a former regenerative torque output control, a latter regenerative torque output control following the former regenerative torque output control, and an HSG driving mode,
   wherein in the former regenerative torque output control, an engine RPM is converted into a regenerative torque output of an HSG when an engine starts idling during a former part set time to charge a battery, and in the latter regenerative torque output control, the engine RPM is converted into the regenerative torque output of the HSG during a latter part set time following the former part set time to continue to charge the battery,
   wherein in the HSG driving mode, output limitation is performed after torque limitation,
   the HSG configured to be connected to the engine and controlled by the controller so that the HSG torque-output limitation is performed.

12. The eco-friendly vehicle of claim 11, wherein the controller includes: a former regenerative torque map in which a maximum torque that is less than a maximum torque of the HSG is mapped as a maximum former HSG mapping torque, and a latter regenerative torque map in which the maximum torque that is less than the maximum torque of the HSG is mapped as a maximum latter HSG mapping torque.

13. The eco-friendly vehicle of claim 12, wherein each of the maximum former HSG mapping torque and the maximum latter HSG mapping torque is matched by a torque-speed diagram of the HSG.

14. The eco-friendly vehicle of claim 13, wherein the maximum former HSG mapping torque is applied for charging the battery for one second at a time of engine idle, and the maximum latter HSG mapping torque is applied for charging the battery after one second to five seconds.

15. The eco-friendly vehicle of claim 11, wherein the controller is a motor control unit (MCU) controlling a driving motor that is connected to and separated from the engine via a clutch, and the MCU is connected to a hybrid control unit controlling a generation load of the HSG.

\* \* \* \* \*